United States Patent
Schulze

(10) Patent No.: US 11,948,007 B2
(45) Date of Patent: Apr. 2, 2024

(54) METHODS FOR EXECUTING COMPUTER EXECUTABLE INSTRUCTIONS

(71) Applicant: VK INVESTMENT GMBH, Tutzing (DE)

(72) Inventor: Michael Schulze, Feldafing (DE)

(73) Assignee: VK INVESTMENT GMBH, Tutzing (DE)

(*) Notice: Subject to any disclaimer, the term of this patent is extended or adjusted under 35 U.S.C. 154(b) by 591 days.

(21) Appl. No.: 17/179,921

(22) Filed: Feb. 19, 2021

(65) Prior Publication Data
US 2021/0263775 A1 Aug. 26, 2021

(30) Foreign Application Priority Data
Feb. 21, 2020 (EP) ..................................... 20158770

(51) Int. Cl.
*G06F 9/50* (2006.01)
*G06F 21/62* (2013.01)

(52) U.S. Cl.
CPC ............ *G06F 9/5016* (2013.01); *G06F 21/62* (2013.01)

(58) Field of Classification Search
CPC ...... G06F 9/5016; G06F 21/62; G06F 21/554; G06F 9/54
See application file for complete search history.

(56) References Cited

U.S. PATENT DOCUMENTS

| | | | |
|---|---|---|---|
| 6,721,824 B1 | 4/2004 | Stewart | |
| 11,561,833 B1* | 1/2023 | Heaton | G06F 9/45504 |
| 2008/0256612 A1* | 10/2008 | Roy | H04L 9/3226 726/5 |

(Continued)

FOREIGN PATENT DOCUMENTS

| | | |
|---|---|---|
| WO | WO-2009137567 A1 | 11/2009 |
| WO | WO-2010018093 A1 | 2/2010 |
| WO | WO-2017019764 A1 | 2/2017 |

*Primary Examiner* — Jorge A Chu Joy-Davila
(74) *Attorney, Agent, or Firm* — PERRY + CURRIER INC.

(57) ABSTRACT

A computer implemented method for executing a first set of computer executable instructions by using a third memory portion (123) of a first computer device (100), the method comprising the steps of executing the first set of computer executable instructions and executing a third set of computer executable instructions. The first set of computer executable instructions comprises instructions which, when the first set of computer executable instructions is executed, cause the first computing device (100) to generate at least a first data item comprising first information. The first computing device (100) also executes a second set of computer executable instructions by using at least a first memory portion (121) of the first computing device (100), the first memory portion (121) consisting of a second memory portion (122), the third memory portion (123) and a fourth memory portion (124), The third set of computer executable instructions is stored in the fourth memory portion (124) and comprises instructions which, when the third set of computer executable instructions is executed, cause the first computing device (100) to store the first information in the second memory portion. The first set of computer executable instructions has no permission to read from and write to the second memory portion (122).

14 Claims, 4 Drawing Sheets

(56) References Cited

U.S. PATENT DOCUMENTS

Figure 1:
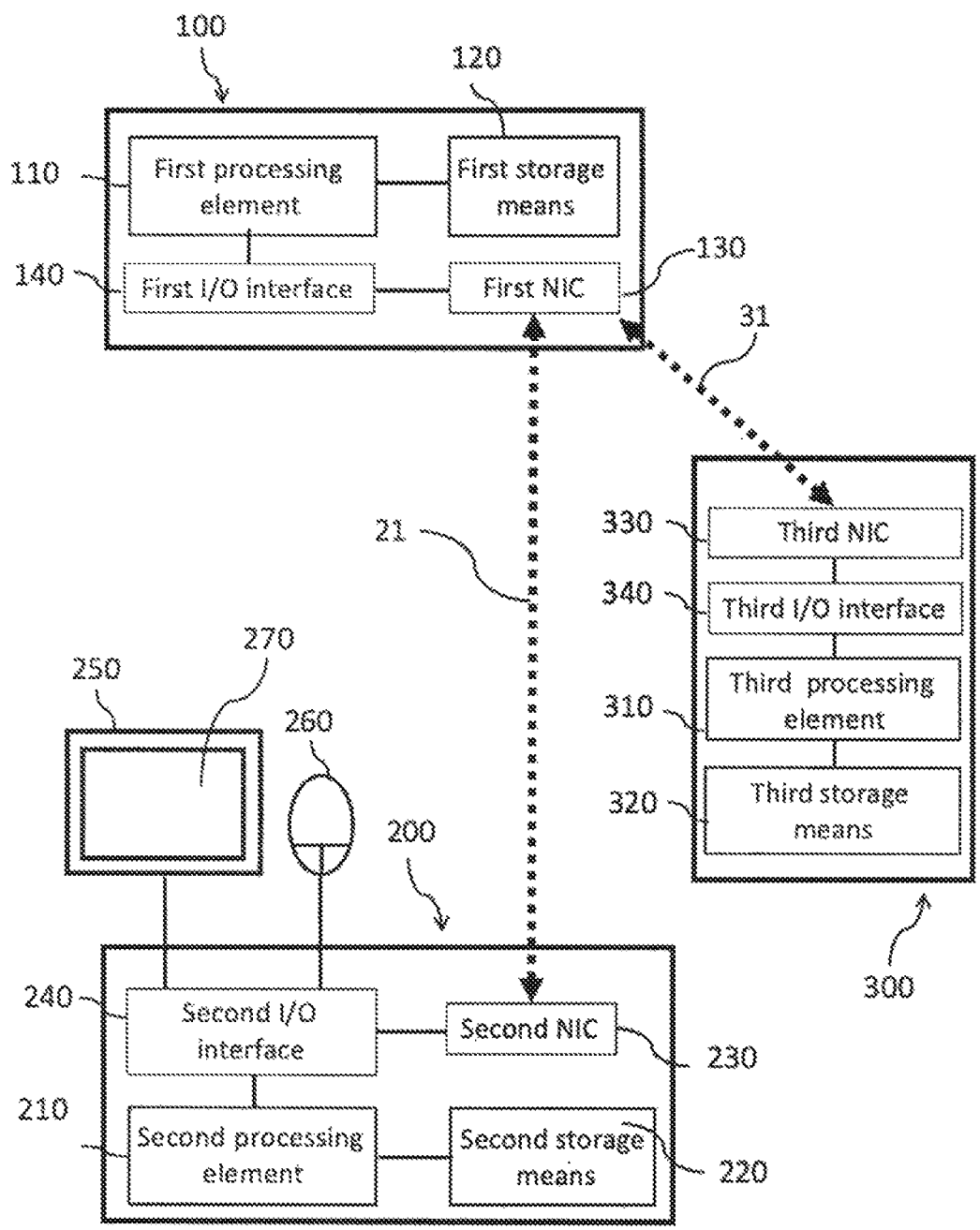

| | | | |
|---|---|---|---|
| 2009/0182977 A1* | 7/2009 | Rao | G06F 13/4234 |
| | | | 711/E12.059 |
| 2015/0046908 A1* | 2/2015 | Salsamendi | G06F 11/3644 |
| | | | 717/129 |
| 2019/0042733 A1 | 2/2019 | Zhang et al. | |

* cited by examiner

METHODS FOR EXECUTING COMPUTER EXECUTABLE INSTRUCTIONS

This application claims priority to European Patent Application No. 20158770.6 filed Feb. 21, 2020.

The present invention relates to computer implemented methods for executing a first set of computer executable instructions, e.g. a first program, by using a memory portion of the memory of a computing device. The computer device also executes a second set of computer executable instructions, e.g. a second program, by using the aforementioned memory portion, said memory portion being allocated to the second set of computer executable instructions.

The present invention concerns also a data processing system, a computer program product, and a computer-readable storage medium for carrying out the methods according to the present invention.

Desktop applications can be installed on and executed by a single computing device (such as a personal computer, a desktop computer, a workstation, or a laptop) to perform specific tasks. Web applications, instead, are client-server computer programs, that, typically, distribute tasks between servers, which provide resources or services, and clients, which request said resources or services.

Typically, the deployment of desktop applications comprises the step of compiling a source code to obtain an executable which is then transferred to the computer systems for execution. The deployment of desktop applications is a cumbersome procedure involving the transfer a relatively big amount of data, i.e. the ones encoded in the executable which, typically, has a file size substantially larger than the one of the source code. Moreover, such a cumbersome procedure has to carried out every time the source code is modified, e.g. every time a new version of the desktop application is released or its release version updated.

The deployment of web applications, instead, does not need any compilations, as, typically, web applications are written by using interpreted computer languages such as Javascript and are deployed and run on the server. Thus, in general, the deployment and update of web applications are faster than the deployment and update of desktop applications. Moreover, the deployment of web applications does not require the client to perform time consuming or computing-intensive activities such as downloading, storing, and/or compiling.

Web applications, however, are typically more vulnerable than the desktop ones. In particular, the source code of web applications is not compiled and can be retrieved, while it is difficult to obtain the source code of the desktop applications by retrieving and analyzing the executable file that has been created by compiling it. Many cyberattacks against web applications are carried out by retrieving and analyzing their source code, which is typically written in HTML, CSS and Javascript, to find vulnerabilities.

Moreover, on the client's side, web applications run under several restrictions aiming to prevent or at least limit nefarious activities perpetrated by malicious web applications. For example, web applications have no permission to read data from or write data to the clients and cannot automatically access the clients' peripherals. Although beneficial for cybersecurity, these restrictions substantially limit the possible tasks that web applications can carry out.

At least some of the aforementioned problems are at least partially solved by the invention of the present application, which relates to a computer-implemented method according to claims 1 and 12, a data processing system according to claim 13, a computer program product according to claim 14, and a computer readable storage medium according to claim 15. Embodiments of the invention are subject matter of the dependent claims.

A first aspect of the present invention refers to a computer implemented method for executing a first set of computer executable instructions by using at least a third memory portion of a memory of a first computing device. The third memory portion is allocated to the first set of computer executable instructions and the first set of computer executable instructions comprises instructions which, when the first set of computer executable instructions is executed by the first computing device, cause the first computing device to generate at least a first data item comprising first information.

The first computing device also executes a second set of computer executable instructions by using at least a first memory portion of the memory of the first computing device. In particular, the first computing device executes the first set of computer executable instructions while executing the second set of computer executable instructions. The first memory portion is allocated to the second set of computer executable instructions and consists of a second memory portion, the third memory portion and a fourth memory portion.

A third set of computer executable instructions is stored in the fourth memory portion and comprises instructions which, when the third set of computer executable instructions is executed by the first computing device, cause the first computing device to store the first information in the second memory portion.

According to the present invention, the first set of computer executable instructions has no permission to read from the second memory portion and has no permission to write to the second memory portion.

Moreover, the computer implemented method according to the first aspect of the present invention comprises at least the steps of:
  executing the first set of computer executable instructions by using at least the third memory portion thereby generating the first data item; and
  executing the third set of computer executable instructions thereby storing the first information in the second memory portion.

According to the present invention, a computing device may in particular comprise a processor (CPU. GPU or the like) and/or a memory. The memory may comprise at least a volatile primary memory (e.g. a RAM, a DRAM, a SRAM, a CPU cache memory or the like), a non-volatile primary memory (e.g. a ROM, a PROM, an EPROM or the like), and/or a secondary memory. In particular, the memory may comprise or consist of a RAM. For instance, the volatile primary memory temporarily holds program files for execution by the processor and related data and the non-volatile primary memory may contain bootstrap code for the operating system of the computing device. For example, a computing device may be a computer system including input and/or output devices and, more particularly, may be a smartphone, a computer, a tablet, or the like.

In particular, the first second, and/or third set of computer executable instructions constitutes or are comprised in a first, second and/or third computer program, respectively.

For instance, the first and the second set of computer executable instructions may be comprised in an event-driven computer program. In this case, the second set of computer executable instructions may comprise instructions which constitute the main loop of the event-driven computer program. The first set of computer executable instructions, instead, may comprise instructions constituting a call-back function of said program. In this case, the second set of computer executable instructions may further comprise instructions which constitute an event handler of the event-driven computer program.

A set of computer executable instructions may be written in machine language, in an assembly language, in a mark-up Language (such as HTML, XML and the like), and/or a programming language (such as Basic, Visual Basic, Java, Javascript, and the like). In particular, a set of computer executable instructions may be written in a scripting language such as Python, ruby, JavaScript, VBScript or the like. A set of computer executable instructions may comprise, e.g. consists of, bytecode instructions.

The first, the second, and/or the third set of computer executable instructions may be organized and stored in a first, a second, and a third file, respectively. The first, the second and/or the third file may be an executable file, a text file, an interpretable file and/or an object file. For example, the first file may an interpretable file and the second and the third file may be executable files.

In particular, a set of instructions stored in a file is computer executable if the instructions of said set may be executed by a computing device, possibly after compiling, interpreting and/or assembling the file in which said set is stored.

A set of instructions stored in a text file is computer executable if, for example, its instructions are written in such a way that the file may be compiled to obtain an executable file. For instance, a set of instructions stored in a file is computer executable lithe instructions of said set may be executed by a computing device using an interpreter accessing said file, in particular, a set of instructions is executable if comprises, e.g. consists of, machine code instructions organized and stored in an executable file.

The process associated to a set of computer executable instructions is the instance of said set, that is generated when the instructions of the set are being executed by the computing device.

When a set of computer executable instructions is executed by a computing device, the process associated thereto may be in a "start" state, i.e. in the initial state when the process is started, or in "ready" state, in which the process is waiting to be assigned to a processor. Alternatively, the process may be in a "running" state, in which its instructions are executed by a processor, or in a "waiting" state. In particular, a process is in the waiting state if it needs to wait for a resource. For instance, the process associated with the second set of computer executable instructions may need the first information and thus be in the "waiting" state while the process associated with the first set of computer executable instructions and/or the process associated with the third set of computer executable instructions are in the "running" state.

Typically, a set of computer executable instructions is executed by a computing device by using a memory portion, said memory portion being allocated, e.g. dynamically allocated, to said set of computer executable instructions. For instance, the first and the third memory portions are allocated. e.g. dynamically allocated, to the second and the first set of computer executable instructions, respectively. For example, a set of computer executable instructions may be stored in the memory portion allocated thereto. A memory portion allocated to a set of computer executable instructions may comprise the code, the data, the stack and the heap of the process associated thereto.

Moreover, a set of computer executable instructions may be executed by a computing device by using a processor of said device. In particular, the processor fetches the instructions from the memory portion allocated to the set of computer executable instructions, decodes and executes said instructions to obtain a result, and stores the result in the processor's register and/or in the memory portion allocated to the set of computer executable instructions.

In particular, the second set of computer executable instructions has permission to write to and/or to read from the second memory portion. For example, the second set of computer executable instructions comprises instructions which, when executed by the first computing device, cause the first computing device to access the first information stored in the second memory portion and, for instance, generate a data item.

For instance, the second set of computer executable instructions has no permission to write to and/or to read from the third memory portion. In this case, the second set of computer executable instructions may access the first information only once it has been stored in the second memory portion. For instance, the first set of computer executable instructions has no permission to write to and/or read from the fourth memory portion.

For example, the third set of computer executable instructions has permission to write to the second memory portion and to read from the third memory portion. Moreover, the third set of computer executable instruction may have the permission to read from the second memory portion and to write to the third memory portion. In particular, the third set of computer executable instructions has permission to read from and/or write to the fourth memory portion.

The second set of computer executable instructions may comprise instructions which, when executed by the first computing device, cause said device to generate the third set of computer executable instructions. For instance, the first program writes the third one. Alternatively, or in conjunction with the above, the first set of computer executable instructions may comprise instructions which, when executed by the first computing device, cause said device to execute at least some of the instructions comprised in the third set of computer executable instructions. In particular, the first program calls the third one.

The third set of computer executable instructions may be comprised in and/or constitute a subroutine and/or a function of a computer program. The third set of computer executable instructions may comprise instructions which, when the third set of computer executable instructions is executed by the first computing device, cause said device to read the first data item from the third memory portion, e.g. the third set of computer executable instructions may accept the first data item as input.

A set of computer executable instructions has no permission to write to and/or read from a memory portion if, in particular, any instructions of said set does not cause the computing device executing said instruction to write data to and/or read data from said memory portion, respectively. For instance, data and/or information are stored in a memory portion if they are stored in at least a region of said memory portion. In particular, the memory portion may consist of said region.

The permissions granted to the first set of computer executable instructions, e.g. to the first program, renders the second and the third memory portion a safe execution environment for the second and the first set of computer executable instructions, respectively. In particular, the data exchange between the first and the second set of computer executable instructions is carried out and regulated using the functionalities of the third set of computer executable instructions.

In particular, if the second set of computer executable instructions stores its instructions, its local and global variables, and/or its outputs in the second memory portion, the first set of computer executable instructions has no permission to read the values of said instructions, variables and outputs. Thus, the first set of computer executable instructions would not be able to infer the behavior of the second set of computer executable instructions by reading its instructions, its variables and its outputs. Thus, the first set of computer executable instructions may be relatively safely executed even if entrusted, e.g. even if it has not met all the requirements to be considered "trusted". Moreover, the first set of computer executable instructions has no permission to write to the second memory portion and thus cannot alter the behavior of the second set of computer executable instructions e.g. by modifying the instructions, the variables, and the outputs thereof. This way, the first set of computer executable instructions may be executed even if untested and may be safely tested under working conditions.

For example, the second set of computer executable instructions may be written in Visual Basic and may, when executed by the first computing device, cause said device to generate a first Visual Basic form comprising components and controls. In particular, when executed by the first computing device, the second set of computer executable instructions cause said device to display the first visual Basic form onto a screen of said device.

In this case, the first information may specify how the attributes and actions of a first component comprised in the first Visual Basic form should be modified to obtain a modified version thereof. Given the permissions of the first set of computer executable instructions, the first information stored in the second memory portion cannot be retrieved, modified, or overwritten by the first set of computer executable instructions. Said information, however, can be retrieved and further processed by the second set of computer executable instructions. In particular, the latter set may comprise instructions which, when executed, cause the first computing device to read the first information from the second memory portion and to modify the first component accordingly.

For example, the first data item may comprise Visual Basic instructions which specify the attributes and actions for the modified version of the first component. The first set of computer executable instructions may thus comprise instructions which, when executed by the first computing device, cause said device to generate said Visual Basic instructions and to execute the third set of computer executable instructions to store them in the second memory portion. The second set of computer executable instructions may comprise instructions which, when executed, cause the first computing device to replace the attributes and actions of the first component with the attributes and actions for the modified version thereof, thereby replacing the first component with the modified version thereof.

By using the methods according to the present invention, the implementation of a new functionality and/or of a new version of a code portion may be carried out without the need of re-deploying the entire application. This way, the deployment of the upgraded version of the application comprising the new functionality and/or the new code portion is streamlined.

For example, the second set of computer executable instructions may constitute the computer executable instructions of a first version of an application which shall be upgraded by including a new or more efficient functionality. According to the present invention, said functionality may be implemented in the first set of computer executable instructions which may be then executed while the second set of computer executable instructions, i.e. the first version of the application, is executed, without the need of terminating the execution of the second set of computer executable instructions. The instructions implementing the new functionality, i.e. the first set of computer executable instructions, run within the memory allocated for the application, i.e. the first memory portion, and their output is ultimately stored in the second memory portion and can be further used, e.g. processed, according to the second set of computer executable instructions.

According to an embodiment of the first aspect of the present invention, the third set of computer executable instructions comprises instructions which, when the third set of computer executable instructions is executed by the first computing device, cause the first computing device to store the first information in the second memory portion at least by causing the first computing device to:
   store the first data item in the fourth memory portion;
   read the first data item from the fourth memory portion thereby accessing the first information; and
   store the first information in the second memory portion.

In particular, the step of storing the first information in the second memory portion allows the second set of computer executable instructions to cause the first computing device to access the first information and thus, for instance, generate a data item.

The step of storing the first information in the second memory portion may be performed by creating data encoding said information and by storing said data in the second memory portion. Alternatively, or in conjunction with the above, said step may be performed by reading the first data item and by copying it to the second memory portion.

In this case, the fourth memory portion may be used as a quarantine region of the first memory portion. For example, the first data item stored in the fourth memory portion may be inspected before storing the first information in the second memory portion to assess whether the first data item is potentially harmful. For instance, the first computing device may be instructed to check) whether the first data item comprises malware instructions or whether said data item is in a format that may be processed and manipulated according to the instructions of the second set of computer executable instructions.

An embodiment of the first aspect of the present invention comprises the step of:
   detecting an initiating event for initiating the step of executing the first set of computer executable instructions.

An event is in particular an action or occurrence recognized by a software of the first computing device. For example, events may be generated and/or triggered by an external user via e.g. a keyboard, by a software such as the operating system and/or by hardware such as a timer. For example, a program may generate an event to communicate the completion of a task.

The step of detecting the initiating event may be carried out by an event handler software run by the first computing device. In particular, the instructions constituting the event handler may be comprised in the second set of computer executable instructions. Thus, the second set of computer executable instructions may comprise instructions which, when the second set of computer executable instructions is executed by the first computing device, cause the first computing device to detect the initiating event.

A further embodiment of the first aspect of the present invention comprises the step of:

receiving initiating data from a second computing device for initiating the step of executing the first set of computer executable instructions.

For example, the second computing device may be the first computing device or the second computing device may be a computing device different from the first one. In particular, the initiating data encode initiating information that causes the first computing device to initiate the step of executing the first set of computer executable instructions. The initiating information may cause the first computing device to directly execute the first set of computer executable instructions or to execute one of more steps that lead to the execution of the first set of computer executable instructions.

The initiating data may be stored in a file or in a plurality of files and/or be in the form of a query written in a Structured Query Language (SQL). Alternatively, or in conjunction with the above, the initiating data may be comprised in a HTTP post request generated by the second computing device and sent to the first computing device.

The second computing device may generate the initiating data and transmit them to the first computing device via a computer network such as an intranet, an extranet, an internetwork, or the intranet. In particular, the first and the second computing devices may be connected with one another by using an Internet protocol suite such as the Transmission Control Protocol (TCP) or the Internet Protocol (IP). For instance, the initiating data may be exchanged by using the Hypertext Transfer Protocol (HTTP).

The initiating event may, for instance, be the receipt of the initiating data. For example, the event handler software run by the first computer device detects the receipt of the initiating data and handles said data. For instance, the event handler software may access the initiating information and initiate the step of executing the first set of computer executable instructions. In particular, the event handler detects the receipt of the initiating data by implementing an API to communicate with native operational system APIs thereby detecting when the initiating data are stored in the memory of the first computing device.

The first and the second computing device may be a server device and a client device, respectively. In this case, the first and the second set of computer executable instructions may be part of a web application stored in the server device that may be called by the client device by sending the initiating data.

The format of the initiating data may be regulated, i.e. the initiating data may have to fulfil at least a formatting condition. For instance, the formatting condition may specify that the initiating data shall comprise a predetermined number of integer numbers, wherein each of these numbers encodes information, that may be relevant for correctly initiating the step of executing the first set of computer executable instructions. The method according to the first aspect of the present invention may thus comprise the step of checking whether the initiating data fulfil at least the formatting condition. In particular, this step is performed by the first computing device upon receipt of the initiating data. This way, the data exchanged between the second and the first computing device may be screened, thereby increasing the security of the first computing device.

A further embodiment of the method of the first aspect of the present invention further comprises the step of:

providing the second computing device with a set of predetermined commands, wherein the set of predetermined commands consists of the commands which the second computing device is allowed to give to the first computing device.

In particular, the set of predetermined commands comprises the command of generating the initiating, data. The step of providing the set of predetermined commands may be performed by the first computing device. In particular, the second set of computer executable instructions may comprise instructions (hereinafter also referred to as: "commanding instructions") which, when executed by the first computing device, cause the first computing device to generate command data and send them to the second computing device. The command data may be received by the second computing device and used, e.g. further processed and; or executed, to generate the set of predetermined commands. For example, the execution of the commanding instructions is initiated by the receipt of a request generated and sent to the first computing device by the second computing device.

For example, the command data may comprise instructions which, when executed by the second computing device, cause said device to generate and display a Graphical User Interface (GUI) on a screen. Said GUI may comprise at least a graphical control element with which a user of the client device may interact e.g. to generate the initiating data.

In this embodiment, the list of commands that the second computer device may be allowed to give to the first computing device is limited and is provided by the latter device e.g. following the instructions of the second set of computer executable instructions. Thus, the first computer device regulates the communications between these two devices, thereby limiting the potential security risks to the first computing device, that may arise from the communications between the first and the second computing device.

An embodiment of the method of the first aspect of the present invention comprises the step of:

generating a second data item using at least the first information stored in the second memory portion.

In particular, the second set of computer executable instructions may comprise instructions (hereinafter also referred to as: "second data item generating instructions") which, when executed by the first computing device, cause the first computing device to generate the second data item. In this case, the step of generating the second data item is performed at least by executing the second data item generating instructions. In particular, the second data item encodes second information which, in particular, may comprise the first information. For example, the execution of the second data item generating instructions is initiated by the storing of the first information in the second memory portion.

An embodiment of the method according to the first aspect of the present invention may comprise the step of:

sending the second data item to a third computing device.

In particular, the third computing device may be the second computing device.

The step of sending the second data item may be initiated by the third computing device. For example, if the third computing device is the second computing device, it may generate the initiating data and transmit them to the first computing device via the computer network. The receipt of the initiating data may cause the execution of the first and the third set of computer executable instructions, the generation of the second data item and, ultimately, may cause the first computing device to initiate the step of sending the second data item to the second computing device.

The step of sending the second data item may be initiated by the third computing device which may request to download the second data item. Upon receipt of said request, the first computing device sends the second data item to the third computing device. In particular, the second data item may be sent to the third computing device by using the HTTP protocol.

If, for example, the first and the second computing device are a server and a client device, respectively, the server device may request a service from the client device by using the initiating data. For instance, this service may be the provision of information comprised in the second data item. Moreover, the second set of computer executable instructions may comprise instructions which, when executed by the first computer device, cause the first computing device to access the information comprised in the initiating data and to execute the first set of computer executable instructions, thereby generating the first data item.

The second set of computer executable instructions may also comprise instructions which, when executed by the first computing device, cause said device to generate the second data item and to provide said data item to the second computing device.

In a further embodiment of the method of the first aspect of the present invention, the second data item comprises video data and, in particular, consists of video data.

Video data may be organized in one or a plurality of video files. For instance, a video file comprises a container containing video data in a video coding format and, optionally, audio data in an audio coding format. The container may also comprise metadata and/or further data which, for instance, may encode synchronization information. A data file may be in a format suitable to be processed and played by a video player software. Suitable formats are, for example, WebM, Matroska, Flash Video, GIF, AVI, Quick time, mp4, MPEG-1, MPEG-2 and the like, in particular, video data may encode functional information and cognitive information. The video player software may thus use the functional information of the video data to display the cognitive information encoded in the video data.

If the second data item comprises or consists of video data, the third computing device may store and execute a video player software for playing the video data sent by the first computing device. The video player software may comprise instructions which, when executed by the third computing device, cause said device to display a video display window, in which the video data are played.

In particular, if the second data item comprises or consists of video data, said video data may be streamed to the third computing device. In this case, the third computing device may store and execute a video streaming software for streaming the video data sent by the first computing device. The video streaming software may comprise instructions which, when executed by the third computing device, cause said device to display a video display window, in which the video data are streamed.

The second data item may comprise the command data. If this is the case, the video playing software and/or the video streaming software, if present, may comprise instructions which, when executed by the second computing device, cause the second computing device to generate the set of predetermined commands according to the information encoded in the command data. For example, said instructions may, when executed by the second computing device, cause said device to display graphical control elements in the display window. A user of the second computing device may interact with said graphical control elements to give to the first computing device at least some of the commands of the set of predetermined commands. Alternatively, or in conjunction with the above, said instructions may, when executed by the second computing device, cause said device to generate an interactive mask, e.g. a transparent interactive mask, overlain over the display window. The mask comprises at least some commands of the set of predetermined commands, so that a user of the second computing device may interact with said mask to give to the first computing device at least some of the commands of the set of predetermined commands.

The exchange of information in the form of video data allows the first computing device to provide the user of the third computing device with information encoded in standardized formats, that do not allow the third computing device to retrieve and analyze the source code responsible for generating said information. The security risks to the first computing device that may arise from the communication between the first and the third computing device are thus reduced.

A further embodiment of the method according to the first aspect of the invention comprises the step (hereinafter referred also to as: "first verification step") of:
checking whether the first data item and/or the first information fulfil a set of verification conditions.

For instance, the first verification step is carried out by the first computing device. The third set of computer executable instructions may comprise instructions which, when executed by the first computing device, cause said device to check at least some of the conditions of the set of verification conditions and, in particular, to carry out the first verification step.

In particular, the step of storing the first information in the second memory portion is carried out only if it has been checked, by performing the first verification step, that the first data item and/or the first information fulfil the set of verification conditions.

For example, the set of verification conditions may comprise or consist of the condition that the first data item shall have a given format or a given structure. Alternatively, or in conjunction with the above, the set of verification conditions may comprise or consist of the condition that the first data item shall have a specific data type. Moreover, the set of verification conditions may comprise or consist of the condition that the first data item does not comprise computer executable instructions, e.g. programs, known to be malicious.

Further, the set of verification conditions may comprise or consist of the condition that the first data item is one of the allowed data items. For example, allowed data items are data items encoding information that the first computing device may process according to the second set of computer executable instructions e.g. to generate the second data item. Furthermore, the set of verification conditions may comprise or consist of the condition that the first data item comprises information specifying that the execution of the first set of computer executable instructions did not generate any warning messages, error messages and/or segmentation fault messages.

If the first set of computer executable instructions is untrusted or untested, the first data item may comprise malicious and/or buggy information, that, when further manipulated, may potentially harm the first computing device and/or jeopardize the correct execution of the second set of computer executable instructions. The verification conditions allow for scrutinizing the first data item before further processing it, thereby reducing risks to the first computing device and/or to the correct execution of the second set of computer executable instructions.

The condition that the first data item shall have a given format or a given structure may be implemented by imposing a corresponding condition on the format in which and/or on the structure according to which the first information should be encoded in order to be successfully handled by the third set of computer executable instructions. For example, if the third set of computer executable instruction accepts the first data item as input, said condition may be implemented by requiring the input of said set to have a given format, e.g. a given data type attribute. For example, this condition may be implemented by writing the third set of computer executable instructions in a statically typed programming language such as C and C++. If the first information does not fulfil the aforementioned format requirement, one or more exceptions, e.g. a format exception, are generated and the storing of the first information in the second memory portion is carried out only if no such exceptions have been generated. In this case, the first verification step does not need to be implemented, as it is performed by the operating system, which, typically, is a stable, well-tested computer program.

In an embodiment of the first aspect of the invention, the first information stored in the second memory portion is comprised in a third data item, the third data item being stored in the second memory portion. For instance, the third data item encodes third information which comprises, e.g. consists of, the first information.

For example, the third data item may have a data type attribute, the data type attribute being value-type.

In particular, data with a value-type data type attribute are stored in the stack of the process, that generates and/or processes said data. For instance, in C++, value types are Boolean, character, integer number, floating-point number, string, and/or list. In Visual Basic, value types are, for example, integer, long, single, double, string, currency, byte and Boolean.

The condition that the third data item shall have a value-type data type attribute (hereinafter also referred to: the "data-type condition") imposes corresponding restrictions on the format in which and/or on the structure according to which the third data item shall be stored in the second memory portion. These restrictions implement a relatively strict verification condition on the third data item. Said verification condition is tailored on the expected content and/or structure of the third data item and allows for an efficient detection of potentially malicious and/or buggy data.

For example, if the first set of computer executable instructions is entrusted or untested, the first data item may comprise malicious and/or buggy information, that, when further manipulated according to the third set of computer executable instructions, may be encoded in the third data item and potentially harm the first computing device and/or jeopardize the correct execution of the second set of computer executable instructions. The data-type condition puts severe constraints on the form and the amount of information that can be stored in the third data item thereby reducing risks to the first computing device and/or to the correct execution of the second set of computer executable instructions.

If the third information is not encoded in the form dictated by the data-type condition, one or more exceptions, e.g. a format exception, are generated. In particular, the step of storing the third data item is carried out only if no such exceptions have been generated.

In a further embodiment of the first aspect of the invention, the third data item may be a first field or a first property of a first object.

In object-oriented programming, an object is, in particular, an instance of a class and may comprise data in the form of at least a field. Typically, an object may also comprise instructions, e.g. code, in the form of at least a method. In particular, a field comprises at least some of the data encapsulated within the object and a method is a procedure associated with the object. For example, in Visual Basic, "Form", "Label", "Timer", and "Control" are classes and the instances thereof are objects. Moreover, in Visual Basic, exemplary methods of a "Timer" object are the "Start", the "Stop", and the "ToString( )" methods. An object may also comprise one or more properties which, typically, encode at least some of the information stored in said object. Properties are supported in many object-oriented languages such as C#, Javascript, Python, Scala, Swift, and Visual Basic. For instance, in Visual Basic, "Width" and "ForeColor" are properties of a "Label" object.

The first property and/or the first field allow for storing a relatively large amount of information by using articulated data structures which may be defined according to the expected content and/or structure of the first data item. These data structures may thus be used to implement relatively strict verification conditions on the third data item. These conditions are tailored on the expected content and/or structure of the first data item and allows for an efficient detection of potentially malicious and/or buggy data. Thus, the first property and/or the first field allows for storing a relatively large amount of information whilst allowing for a thorough scrutiny of the information comprised therein.

In an embodiment of the first aspect of the present invention, the third set of computer executable instructions comprises instructions which, when the third set of computer executable instructions is executed by the first computing device, cause the first computing device to store the first information in the second memory portion at least by causing the first computing device to:
  generate the third data item; and
  store the third data item in the second memory portion, thereby storing the first information in the second memory portion.

For instance, the third set of computer executable instructions may comprise instructions which, when executed by the first computing device, cause said device to manipulate the first data item so as to generate the third data item and store the third data item in the second memory portion.

In a further embodiment of the first aspect of the present invention, the step of generating the second data item may be performed by using the third data item and/or the third information. In particular, the second information may comprise the third information.

The generation of the second data item may depend only indirectly on the first information. For example, the generation of the second data item may depend on the first information only via its dependence on the third information which, in turn, comprises the first information.

For instance, if, as in an example mentioned above, the first information specifies how the attributes and actions of the first component comprised in the first Visual Basic form should be modified, the third data item may comprise a set of Visual Basic instructions which, when executed by the first computing device, cause the first computing device to generate a second Visual Basic form. In particular, the second Visual Basic form is obtained by modifying the first Visual Basic form according to the first information. In this case, the second data item may comprise or consist of video data which, when played by the video playing software or the video streaming software of the third computing device, cause said software to play or stream a video onto a screen of said device, this video depicting at least the second Visual Basic form.

According to this embodiment, the information generated by executing the first and the third set of computer executable instructions, i.e. the third information, may be further encoded in the second data item so that the second computing device may access the third information without having the possibility to infer, analyze or retrieve the source codes responsible for generating said information. For example, this may be achieved if the second information is encoded in a video format, e.g. if the second data item comprises or consists of video data.

In a further embodiment of the first aspect of the present invention, the third set of computer executable instructions may be comprised in or constitute a second property of a second object. Alternatively, or in conjunction with the above, the third set of computer executable instructions may be comprised in and/or constitute a first method of a third object. In particular, the second set of computer executable instructions may comprise instructions which, when executed by the first computing device, cause said device to create the second and/or the third object.

The third object may be the first and/or the second object and/or the first object may be the second object. Moreover, the first property may be the second property. For example, the third set of computer executable instructions may be comprised in or constitute a setter and/or a getter of the second property.

In particular, the first method may be a mutator method to control the value of the first property, of the first field and/or of the second property. For instance, the first method allows for modifying the first property and/or the first field of the first object, thereby providing encapsulation of the first property and/or the first field.

The encapsulation of these properties and this field protects their integrity e.g. from manipulations caused by potentially malicious and/or inconsistent actions caused by the execution of the first set of computer executable instructions. This way, security risks to the first computing device and/or to the execution of the second set of computer executable instructions are further reduced.

In an embodiment of the method according to the first aspect of the present invention, the second set of computer executable instructions comprises instructions (hereinafter also referred to as: "object creating instructions") which, when executed by the first computer device, cause said device to create the first, the second, and/or the third object. Moreover, the method may further comprise the step of creating the first, the second and/or the third object by executing the object creating, instructions.

In particular, the first, the second and/or the third object may be created by instantiating a first, a second, and a third class, respectively. Moreover, the object creating instructions may, when executed by the first computer device, cause the first computing device to generate and instantiate the first, the second and/or the third class to create the first, the second and the third object, respectively.

The step of creating the first, the second and/or the third object may depend on the initiating data, on the functionalities of the first set of computer executable instructions, and/or on the content and format of the first data item. These objects may thus be defined so as to store a relatively large amount of information and to implement verification conditions that allows for implementing relatively strict verification conditions, Said conditions may be tailored on the expected content and/or the expected structure of the first data item and on the functionalities of the second set of computer executable instructions. Thus, such verification conditions allow for an efficient detection of potential malicious and/or buggy data, that may jeopardize the correct execution of the second set of computer executable instructions.

An embodiment of the method of the first aspect of the present invention further comprises the step (hereinafter also referred to as: "first checking step") of:
    checking whether the first set of computer executable instructions is stored in the first memory portion.

If the first set of computer executable instructions is not stored in the first memory portion, the method may further comprise the step of:
    compiling and/or assembling a first source code thereby obtaining the first set of computer executable instructions.

In particular, the first set of computer executable instructions may be stored in the fourth memory portion. Moreover, the method may further comprise the step of storing the first source code in the fourth memory portion.

The first source code may be stored and organized in at least a first source code file or in a plurality of source code files. The first source code may be written in a low-level programming language such as an assembly language, in a high-level programming language such as a mark-up language (HTML, XML and the like), and/or in a programming language such as Basic, Visual Basic, Java, Javascript and the like. In particular, the first source code file may be a text file.

In this embodiment, the implementation of a new functionality and/or a new version of a code portion may be carried out without the need of re-deploying the entire application, thereby streamlining the re-deployment process. For instance, the first set of computer executable instructions may comprise the instructions of an updated version of an application. Said application comprises also the second set of computer executable instructions which, however, do not need to be updated. if this is the case, according to this embodiment, the updated version of the application may be deployed by compiling only the updated source code, i.e. the first source code. Moreover, the step of checking whether the first set of computer executable instructions is stored in the first memory portion allows for redeploying the application only if needed.

If the first set of computer executable instructions is not stored in the first memory portion, the method may further comprise the step (hereinafter also referred to as: "second checking step") of:
    checking whether the first source code is stored in the memory.

If the first set of computer executable instructions is not stored in the first memory portion and the first source code is not stored in the memory, the method may further comprise the steps of:
    acquiring at least a first portion of the first source from a secondary memory; and/or
    acquiring the first portion of the first source code from a database system.

For instance, the first portion of the first source code is stored and organized in the first source code file. In particular, the first source code may consist of the first portion of the first source code. The secondary memory may be comprised in a computing, device which is different from the first computing device.

In this embodiment, the storing of the source code of an application may profit from the functionalities and the storage space of the database system whilst reducing the time spent during the application's deployment to acquire the source code from the database system. In particular, according to this embodiment, the updated version of the application may be deployed by acquiring and compiling only the updated source code, i.e. the first portion of the first source code, without the need of acquiring and compiling the portions of the source code, that are not updated. Moreover, the step of checking whether the first source code is stored in the memory allows for acquiring the first source code only if needed.

The database system may comprise a database and a database management system (DBMS) and may be hosted by a fourth computing device and/or by the first computing device. The fourth computing device may, for instance, be a database server that provides database services to the first computing device according to the client-server model. In particular, the database system may be stored in a secondary memory comprised in the fourth computing device.

For example, the step of acquiring the first portion of the first source code from a database system is performed by retrieving or by receiving said source code from the fourth computing device hosting the database system. The first portion of the first source code may then be stored in the fourth memory portion and, together with the other portions of the first source code, compiled and/or assembled to obtain the first set of computer executable instructions.

The second set of computer executable instructions may comprise instructions which, when executed by the first computing device, cause the first computing device to carry out the step of acquiring the first portion of the first source code from the database system. In particular, said execution may cause the first computing device to generate and send an acquiring query to the database system for acquiring the first portion of the first source code.

The second computing device may initiate the step of acquiring the first portion of the first source code by generating the initiating data described above. In particular, the first computing device may detect the receipt of the initiating data and, upon receipt of said data, perform the step of acquiring the first portion of the first source code.

The detection of the initiating event may cause the initiating of a first chain of steps comprising the step of acquiring the first portion of the first source code, the step of compiling and/or assembling the first source code, and the step of executing the first set of computer executable instructions. The steps in said first chain may be carried out in the order in which they are listed above and the completion of each step initiates the subsequent step. In this case, the initiating event may initiate the first chain of steps by initiating the step of acquiring the first portion of the first source code. For example, if the initiating event is the receipt of the initiating data, the initiating data may encode initiating information that causes the first computing device to initiate the step of acquiring the first portion of the first source code from the database system. The completion of the acquisition of the first portion of the first source code may initiate the step of compiling and/or assembling of the first source code. The completion of the compiling of the first source code initiates the execution of the first set of computer executable instructions.

For instance, the detection of the initiating event may cause the initiating of a second chain of steps comprising the step of acquiring the first portion of the first source code, the step of compiling and/or assembling the first source code, the step of executing the first set of computer executable instructions, the step of executing the third set of computer executable instructions, the step of generating the second data item, and the step of sending the second data item to the second computing device. In particular, the steps in the second chain may be carried out in the order in which they are listed above and the completion of each step of the second chain may initiate the subsequent step of the second chain. Thus, in this case, the detection of the initiating event may cause the initiating of the second chain of steps by initiating the step of acquiring the first portion of the first source code from the database system.

Another embodiment of the method of the first aspect of the present invention comprises the step of:
  receiving the initiating data from the second computing device for initiating the step of executing the first set of computer executable instructions.

In particular, the initiating data comprises information about the second computing device. Moreover, the first checking step, the second checking step, and/or the acquiring of at least a first portion of the first source code may depend on the information about the second computing device.

If the step of acquiring the first portion of the first source code is performed by submitting the acquisition query to the database system, the acquisition query may depend on the information about the second computing device.

For example, the information about the second computing device may comprise identification information specifying that the second computing device has permission to initiate the execution of the first set of computer executable instructions, to query the database, and/or to initiate the compilation and/or assembly of the first source code.

For instance, the identification information comprises or consists of a digital signature, that may be generated by using a private key. The method may also comprise the step of verifying whether the digital signature has been generated by using said key. Said step may be performed by using the public key associated to the private key and/or may be carried out by the first and/or the fourth computing device. In particular, the first checking step, the second checking step and/or the step of acquiring the first portion of the first source code may be carried out only if the digital signature has been generated by using the private key.

The information about the second computing device allows for customizing and regulating the acquisition of the first portion of the source code. In particular, this information allows for checking the identity of the device initiating the method according to the first aspect of the invention, thereby increasing the security of the first computing device.

According to an embodiment of the first aspect of the present invention, the information about the second computing device comprises information about permission to initiate the step of acquiring the first portion of the first source code from the database system.

For example, the second computer device may have no permission to initiate the step of acquiring the first portion of the first source code due to security reasons, e.g. the second computing device is untrusted or untrustworthy. Alternatively, or in conjunction with the above, the second computer device may have no permission to initiate the step of acquiring the first portion of the first source code because said portion is untested and/or is known to be buggy or to deliver wrong results.

The second computing device may have no permission to initiate the step of acquiring the first portion of the first source code because the hardware and/or the software of the second computing device are not able to process and/or execute the second data item sent to the second computing device by the first computing device.

In this case, the permission of the second computing device to initiate the method according to the first aspect of the present invention is subject to its capability to process the second data item properly. This, in turns, lead to a reduction of the security risks stemming from an inappropriate handling of the data received from the first computing device.

The information about permission to initiate the step of acquiring the first portion of the first source code may comprise technical information about the second computing device, such as the processors type, the memory size, the type and/or version of the operating system, or the like. Alternatively, or in conjunction with the above, the information about permission to initiate the step of acquiring the first portion of the first source code may comprise the identification information described above.

In particular, the method may comprise the step (hereinafter also referred to as: "second verification step") of verifying, by using the information about the permission to acquire the first portion of the first source code from the database system, whether the second computing device has permission to acquire the first portion of the first source code from the database system. The second verification step may be performed by the first and/or the fourth computing device. For example, the step of acquiring the first portion of the of the first source code from the database system and/or the step of executing the first set of computer executable instructions are carried out only if it has been verified, by using the second verification step, that the second computing device has permission to acquire the first portion of the first source code from the database system.

The information about the permissions of the second computing device allows for controlling, regulating and/or limiting its right to initiate the method according to the first aspect of the present invention, thereby increasing the security of the first computing device.

In a further embodiment of the first aspect of the present invention, the information about the second computing device comprises information (hereinafter also referred to as: "execution information") specifying that the first set of computer executable instructions is to be executed.

For example, the first computing device may access the execution information to establish which set of computer executable instructions is to be executed and to check whether either said set or the source code associated thereto are stored in the memory. If this is not the case, the first computing device may acquire the source code from the database system and compile and/or assemble it to generate the set of computer executable instructions to be executed.

For instance, the database system may store several versions of a call-back function, the first set of computer executable instructions being one them. Each of these versions is associated to versioning information, e.g. an alphanumeric code, which allows for uniquely determining the version of the call-back function. If this is the case, the execution information may comprise or consist of the versioning information associated to the first source code.

The execution information may be generated by the second computing device by using technical information about said device, e.g. about the hardware of and/or the software stored in the second computing device. For instance, said information may specify that the first set of computer executable instructions is the version of the call-back function that shall be acquired because it is a version known for generating a data item, i.e. the second data item, that may be properly received, processed and/or executed by the second computing device. This, in turns, leads to a reduction of the security risks stemming from an inappropriate handling of the data received from the first computing device.

For example, the second set of computer executable instructions may comprise instructions which, when executed by the first computing device, cause said device to generate the third set of computer executable instructions. The generating of the third set of computer executable instructions may depend on the executing information. Thus, the third set of computer executable instructions may be tuned to the first set of computer executable instructions and the first data item e.g. to adapt the verification conditions to the first set of computer executable instructions and; or to the format the first data item.

In particular, the execution information allows different client devices to initiate different set of computer executable instructions, and in particular different versions of the same function. This way, for instance, client device with a "developer status" may access to the beta version of a function and test it in a working environment and without the need of re-deploying the entire application.

According to a further embodiment of the first aspect of the present invention, the second set of computer executable instructions comprises instructions (hereinafter also referred to as: "source code generating instructions") which, when executed by the first computing device, cause the first computing device to generate a second portion of the first source code. Moreover, the method may further comprise the step of:

generating the second portion of the first source code by executing the source code generating instructions.

In particular, the execution of the source code generating instructions is initiated by the acquisition of the first portion of the first source code from the database system.

The second portion of the first source code may comprise boilerplate code. Said portion may comprise code, that does not depend on the functionalities of the first set of computer executable instructions and thus, typically, is not modified when these functionalities are updated. Thus, typically, the code comprised in the second portion of the first source code is independent of the version of the call-back function.

In particular, the second portion of the first source code comprises instructions which, when executed by the first computing device, cause the first computing device to check at least an action executed by the first computing device according to the instructions comprised in the first portion of the first source code. If, for example, said action is the generation of the first data item, the second portion of the first source code may comprise instructions which, when executed by the first computing device, cause said device to check whether the first data item fulfils at least a verification condition comprised in the set of verification conditions. The second portion of the first source code thus decreases the security risks to the first computing device and to the correct execution of the second set of computer executable instructions.

The second portion of the first source code may be stored and organized in the first source code file together with the first portion of the first source code. Alternatively, the second portion of the first source code may be stored and organized in a second source file, different from the first source file.

Rather than to be stored in the database system, in this embodiment the second portion of the first source code is created by the first computing device and allows for reducing the amount of data stored in the database system and, thus, the time needed to acquire the source code from said system.

In an embodiment of the first aspect of the present invention, the second set of computer executable instructions comprises instructions which, when executed by the first computing device, cause said device to carry out the step of executing the first set of computer executable instructions by using the third memory portion and/or the step of executing the third set of computer executable instructions.

In another embodiment of the method according to the first aspect of the present invention, the second memory portion consists of a fifth memory portion, a sixth memory portion and a seventh memory portion.

Moreover, when executed by the first computing device, the third set of computer executable instructions cause the first computing device to store the first information in the fifth memory portion.

Furthermore, in this embodiment, the sixth memory portion is allocated to a fourth set of computer executable instructions. The fourth set of computer executable instructions comprises instructions which, when the fourth set of computer executable instructions is executed by the first computing device, cause the first computing device to generate at least a fourth data item comprising fourth information.

According to this embodiment, a fifth set of computer executable instructions is stored in the seventh memory portion and comprises instructions which, when the fifth set of computer executable instructions is executed by the first computing device, cause the first computing device to store the first information in the fifth memory portion.

Furthermore, this embodiment may further comprise the steps of:
  executing the fourth set of computer executable instructions by using the sixth memory portion, thereby generating the fourth data item; and
  executing the fifth set of computer executable instructions thereby storing the fourth information in the fifth memory portion.

In particular, the fourth set of computer executable instructions has no permission to read from and/or to write to the fifth memory portion. For instance, the second set of computer executable instructions has no permission to read from and/or to write to the sixth memory portion. For example, the step of storing the fourth information in the fifth memory portion allows the second set of computer executable instructions to access the fourth output information and thus, for instance, generate a data item.

The process associated with the second set of computer executable instructions may need the fourth information and thus be in the "waiting" state while the process associated with the fourth set of computer executable instructions and/or the process associated with the fifth set of computer executable instructions are in the "running" state.

In particular, the fifth set of computer executable instructions has permission to write to the fifth memory portion and to read from the sixth memory portion. Moreover, the fifth set of computer executable instruction may have the permission to read from the sixth memory portion and to write to the fifth memory portion. For example, the fifth set of computer executable instructions has the permission to read from and/or write to the seventh memory portion.

The second set of computer executable instructions may comprise instructions which, when executed by the first computing device, cause said device to generate the fifth set of computer executable instructions. The fourth set of computer executable instructions may comprise instructions which, when executed by the first computing device, cause said device to execute at least some of the instructions comprised in the fifth set of computer executable instructions.

For example, the fifth set of computer executable instructions may be comprised in and/or constitute a subroutine and/or a function of a program. The fifth set of computer executable instructions may comprise instructions which, when said set is executed by the first computing device, cause said device to read the fourth data item from the sixth memory portion, e.g. the fifth set of computer executable instructions may accept the fourth data item as input.

The permissions granted to the fourth set of computer executable instructions, renders the fifth, the third, and the sixth memory portion a safe execution environment for the second, the first, and the fourth set of computer executable instructions, respectively. In particular, the data exchange between the second and the fourth set of computer executable instructions is carried out and regulated using the functionalities of the fifth set of computer executable instructions.

In particular, if the second set of computer executable instructions stores its instructions, its local and global variables, and; or its outputs in the fifth memory portion, the first and the fourth set of computer executable instructions will not be able to read the values of said instructions, variables and outputs. Moreover, in this case, the first and the fourth set of computer executable instructions have no permission to write to the fifth memory portion and thus cannot alter the behavior of the second set of computer executable instructions e.g. by modifying the instructions, the variables and the outputs thereof.

The execution of the first and the fourth set of computer executable instructions may be initiated by a first and a second client device, respectively. In this embodiment of the first aspect of the invention, the processes initiated by these two clients cannot communicate with one another, thereby minimizing the risk of information leakage.

In a further embodiment of the first aspect of the invention, the second set of computer executable instructions comprises instructions (hereinafter also referred to as: "processing instructions") which, when the processing instructions are executed by the first computing device, cause said device to perform a task. In particular, said task depends on the first information. The method of the present invention may further comprise the step of executing the processing instructions.

The aforementioned task may, for instance, comprise and/or consist of the task of reading and/or retrieving the first information from the second memory portion. Moreover, said task may comprise the generation of the second data item.

For example, if the first information specifies how the attributes and actions of the first component comprised in the first Visual Basic form should be modified, the task mentioned above may comprise the retrieval of the first information and the modification of the first component of the first Visual Basic form according to said information.

In an embodiment of the first aspect of the invention, the second set of computer executable instructions comprises instructions (hereinafter also referred to as: "fifth data item generating instructions") which, when executed by the first computing device, cause the first computing device to generate at least a fifth data item, the fifth data item being generated by using at least the first information. Moreover, the step of generating the second data item may be performed by using at least the fifth data item and/or the second data item may consist of the fifth data item. For example, the execution of the fifth data item generating instructions is initiated by the storing of the first information in the second memory portion.

A second aspect of the present invention refers to a computer implemented method for initiating the executing of the first set of computer executable instructions by using at least the third memory portion of the memory of the first computing device, the third memory portion being allocated to the first set of computer executable instructions.

The first set of computer executable instructions comprise instructions which, when the first set of computer executable instructions is executed by the first computing device, cause the first computing device to generate at least the first data item comprising the first information.

According to the second aspect of the present invention, the first computing device executes also the second set of computer executable instructions by using at least the first memory portion of the memory, the first memory portion being allocated to the second set of computer executable instructions. In particular, the first computing device executes the first set of computer executable instructions while executing the second set of computer executable instructions.

The first memory portion consists of the second memory portion, the third memory portion and the fourth memory portion.

The third set of computer executable instructions is stored in the fourth memory portion and comprises instructions which, when the third set of computer executable instructions is executed by the first computing device, cause the first computing device to store the first information in the second memory portion.

Moreover, the first set of computer executable instructions has no permission to write to the second memory portion and the first set of computer executable instructions has no permission to read from the second memory portion. In particular, the second set of computer executable instructions has no permission to write to and/or read from the third memory portion.

Furthermore, the method according to the second aspect of the invention comprises at least the step of initiating the carrying out the method according to the first aspect of the present invention. In particular, said step is performed by the second computer device.

According to an embodiment of the method of the second aspect of the present invention, the step of initiating the carrying out of the method according to the first aspect of the present invention is performed by generating the initiating data.

The present invention refers also to a data processing system comprising at least a memory and a processor configured to perform the methods according to the present invention.

In particular, the first computing device is a data processing system comprising a processor configured to perform the method according to the first aspect of the present invention. For instance, the second computing device may be a data processing system comprising a processor configured to perform the method according to the second aspect of the present invention.

Moreover, the present invention refers to a computer program product comprising instructions which, when the program is executed by a computer, cause the computer to carry out the methods according to the present invention.

The present invention refers also to a computer-readable storage medium comprising instructions which, when executed by a computer, cause the computer to carry out the methods of the present invention. M particular, the computer readable medium is non-transitory.

Figure 2A:
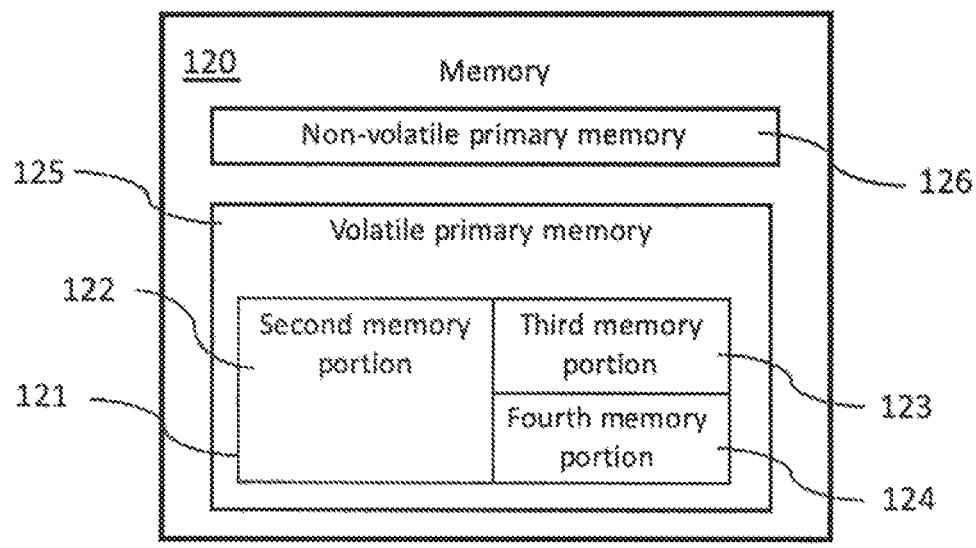
Figure 2B:
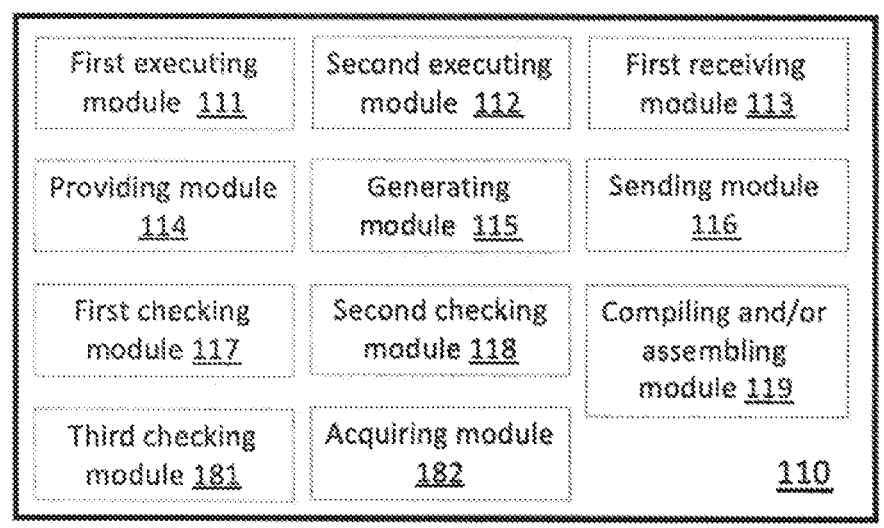
Figure 3:
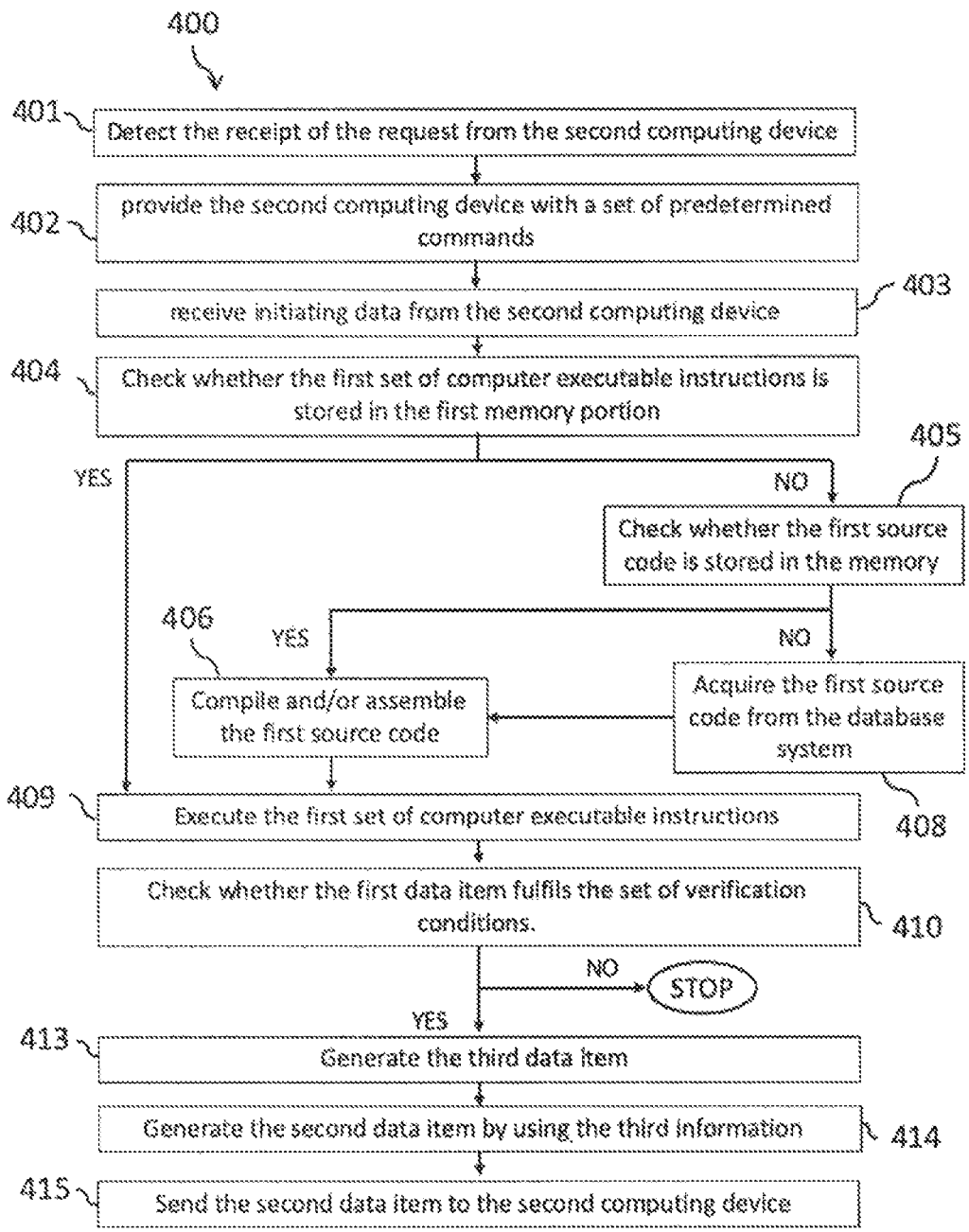
Figure 4A:
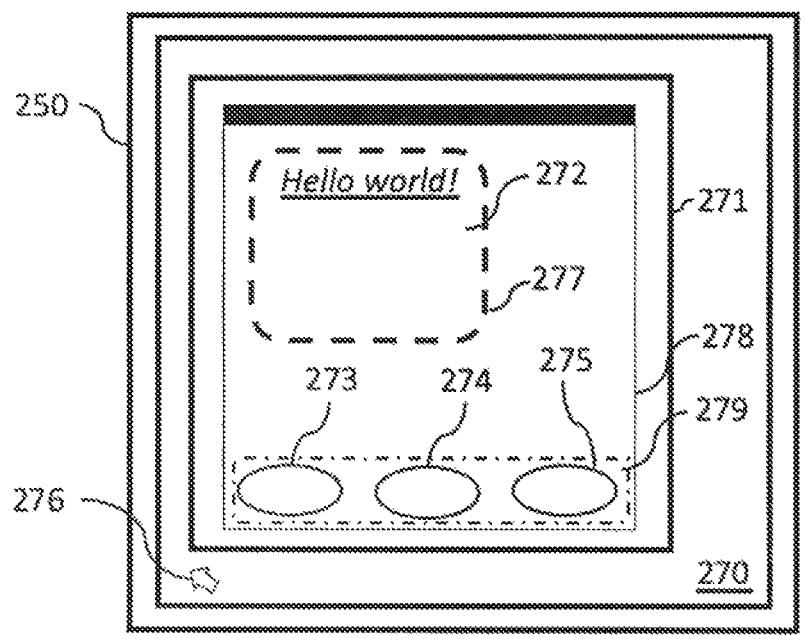
Figure 4B:
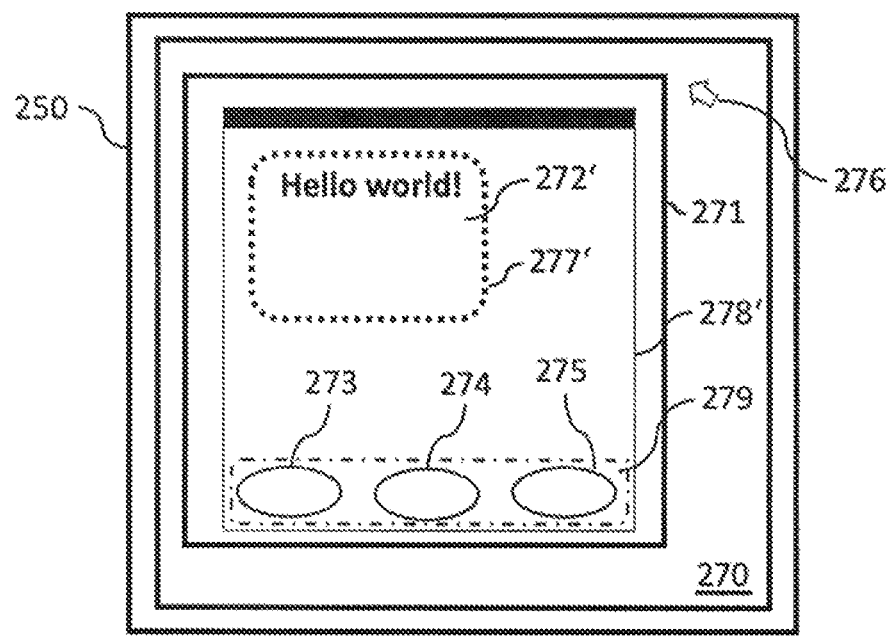

Exemplary embodiments of the invention are described in the following with respect to the attached figures. The figures and corresponding detailed description serve merely to provide a better understanding of the invention and do not constitute a limitation whatsoever of the scope of the invention as defined in the claims. In particular:

FIG. 1 is a schematic representation of a first embodiment of the first computing device, of a first embodiment of the second computing device and of first embodiment of the fourth computing device according to the present invention;

FIG. 2*a*, 2*b* are, respectively, a schematic representation of the first storage and of the first processor of the first embodiment of the first computing device;

FIG. 3 is a flow diagram of the operation of an embodiment of the method according to the first aspect of the present invention; and FIGS. 4*a*, 4*b* are schematic representations of screenshots of the screen of the first embodiment of the second computing device.

FIG. 1 depicts a schematic representation of a first embodiment of the first computing device 100, of a first embodiment of the second computing device 200 and of the first embodiment of the fourth computing device 300.

The first computing device 100 comprises a first processor 110 and first storage 120, i.e. the memory, which are in data communication with one another. The first processor 110 may comprise a CPU and/or a GPU.

As schematically shown in FIG. 2*b*, the first processor 110 comprises a first executing module 111 configured to execute the first set of computer executable instructions to generate the first data item. Moreover, said processor 110 may comprise a second executing module 112 configured to execute the third set of computer executable instructions to store the first information in the second memory portion 122. The first processor 110 may also comprise a third executing module (not shown) configured to execute the second set of computer executable instructions. In particular, the first processor 110 may further comprise:

- a first receiving module 113 configured to receive initiating data from the second computing device 200; and/or
- a providing module 114 configured to provide the second computing device 200 with the set of predetermined commands; and/or
- a generating module 115 configured to generate the second data item using at least the first information stored in the second memory portion 122; and/or
- a sending module 116 configured to send the second data item to the third computing device (not shown); and/or
- a first checking module 117 configured to check whether the first data item and/or the first information fulfil the set of verification conditions; and/or
- a second checking module 118 configured to check whether the first set of computer executable instructions is stored the first memory portion 121; and/or a compiling and/or assembling module 119 configured to compile and/or assemble the first source code; and/or a third checking module 181 configured to check whether the first source code is stored in the memory 120; and/or an acquiring module 182 configured to acquire at least a first portion of the first source code from the database system and/or a secondary memory.

The memory 120 of the first embodiment of the first computing device 100 is schematically represented in FIG. 2a and comprises a volatile primary memory 125 which may comprise or consist of a RAM. The memory 120 may further comprise a non-volatile primary memory 126 and/or a secondary memory (not shown). The secondary memory may store a computer program product comprising instructions which, when the computer program product is executed by the processor 110, cause the first computing device 100 to carry out the method according to the first aspect of the present invention. As best represented in FIG. 2a, the volatile primary memory 125 comprises the first memory portion 121 which is allocated, e.g. dynamically allocated, to the second set of computer executable instructions. The first memory portion 121 consists of the second memory portion 122, of the third memory portion 123 and of the fourth memory portion 124. The third memory portion 123 is allocated, e.g. dynamically allocated, to the first set of computer executable instructions.

The secondary memory, the primary memories 125, 126, and the processor 110 need not be physically housed within the same housing and may instead be spatially separated from one another. In particular, they may be spatially separated from one another and may exchange data with one another via wired and/or wireless media (not shown).

The second computing device 200 comprises a second processor 210 and second storage 220. The second processor 210 ma comprise a CPU and/or a GPU and may comprises a module (not shown) configured to perform the step of initiating the carrying out the method according to the first aspect of the present invention.

The fourth computing device 300 hosts the database system and comprises a third processor 310 and third storage 320. In particular, the first processor 310 comprises a CPU and/or a GPU. The third storage 320 store the database and the database management system software.

The first 100, the second 200, and the fourth 300 computing device further comprise a first 140, a second 240, and a third 340 input/output (I/O) interface, respectively, for communicating with input/output devices (e.g. displays, keyboards, touchscreens, printers, mice, or the like). As shown in FIG. 1, the second computing device comprises at least a display unit 250, which comprises a screen 270, and at least an input device in the form of a mouse 260. Both the display unit 250 and the mouse 260 are connected to the second processor 210 via the second I/O interface 240.

The first 100, the second 200, and the fourth 300 computing device respectively comprise a first 130, a second 230, and a third 330 network interface controller (NIC) configured to connect said devices with one or more suitable networks. According to the present invention, a suitable network may for instance be an intranet, the Internet or a cellular network. In particular, the display unit 250 and/or the mouse 260 may connected wirelessly to the second I/O interface 240 via the second NIC 230.

The first computing device 100 and the fourth computing device 300 may exchange data with one another via the first NIC 130 and the third NIC 330. In particular, the fourth computing device 300 is the database server that provides database services to the first computing device 100 according to the client-server model. The first computing device 100 and the fourth computing device 300 may be connected with one another by using a first protocol suite such as TCP and IP, said protocol being schematically represented in FIG. 1 by a first double arrowed dashed line 31.

The first computing device 100 and the second computing device 300 may exchange data with one another via the first NIC 130 and the second NIC 230. In particular, they may be connected with one another by using a second protocol suite such as TCP and IP, said protocol being schematically represented in FIG. 1 by a second double arrowed dashed line 21.

FIG. 3 is a flow diagram 400 of the operation of an embodiment of the method according to the first aspect of the present invention. In particular, said embodiment may be carried out by the first embodiment of the first computing device 100 schematically depicted in FIG. 1.

The first computer device 100 is executing the second set of computer executable instructions by using the first memory portion 121. The second set of computer executable instructions comprises an event handler which, when the second set of computer executable instructions is executed by the first computing device, causes, at step 401, the first computing device 100 to detect the receipt of a request for providing the set of predetermined commands to the second computing device 200. In particular, this request has been sent by the second computing device 200 which may be instructed by a user to send a request for providing the set of predetermined commands.

At step 402, the first computing device 100 provides the second computing device 200 with a set of predetermined commands. More specifically, the detection of the receipt of the aforementioned request triggers the execution of instructions of the second set of computer executable instructions that cause the first computing device 100 to generate initial data and send them to the second computing device via the second protocol suite 21. The initial data comprise the command data and first video data.

The initial data are received and processed by the second computing device 200 which executes a video streaming software for streaming the first video data. This software comprises instructions which, when executed by the second computing device 200, cause said device to display a video display window 271 on the screen 270 of the display unit 250.

The video display window 271 streams the first video data. As best shown in FIG. 4a, the first video data render a Visual basic form 278 comprising a first text box 272 with a dashed border 277. The text box shows underlined characters in italic font, that form the sentence "Hello world!".

Moreover, the video streaming software comprise instructions which, when executed by the second computing device, cause the second computing device to generate an interactive mask 279 according to the command data. In particular, said mask 279 overlies over the display window 271 and comprises the set of predetermined commands. As schematically shown in FIG. 4a, the predetermined commands comprise three graphical control elements in the form of a first 273, a second 274 and a third 275 oval button. The user of the second computing device 200 may give the command of generating and sending the initiating data to the first computing device 100 by clicking on the first button 273 with the arrow 276 controlled via the mouse 260.

When the user clicks the first button 273, the second computing device 200 generates the initiating data and sends them to the first computing device 100 via the second protocol suite 21. The initiating data comprise the execution information specifying that the first set of computer executable instructions is to be executed.

At step 403, the first computing device 100 receives the initiating data from the second computing device 200. The event handler comprised in the second set of computer executable instructions cause the first computing device 100 to detect the receipt of the initiating event. Said detection triggers the execution of instructions of the second set of computer executable instructions that cause the first computing device 100 to access the execution information and to establish that the set of computer executable instructions to be executed is the first set of computer executable instructions. For example, the latter set may be the release version of a call-back function program, said version being characterized by a given alphanumeric code.

In particular, the first computing device 100 may generate the third set of computer executable instructions according to the instructions of the second set of computer executable instructions. The generating of the third set of computer executable instructions depends on the executing information.

At step 404, the first computing device 200 checks whether the first set of computer executable instructions is stored in the first memory portion 121, if this is the case, the first computing device executes the first set of computer executable instructions (step 409), otherwise checks whether the source code associated to the first set of computer executable instructions, i.e. the first source code, is stored in the memory 120 of the first computing device (step 405), if the first source code is stored in the memory 120, the first computing device 100 compiles and/or assembles said source code to generate the first set of computer executable instructions (step 406). Otherwise, it acquires the first source code from the database system hosted by the fourth computing device 300 (step 408).

In particular, at step 408, the first computing device 100 sends the acquiring query to the database system hosted by the fourth computing device 300 via the first internet protocol suite 31. This query may be generated by using the execution information and specifies that the first source code should be provided to the first computing device 100. For instance, the execution information comprises the given alphanumeric code associated to the release version of the call back function, which allows for uniquely determining the version of the call-back function that has to be sent to the first computing device 100.

The DBMS causes the third processor 310 to retrieve the first source code and send it to the first computing device 100 via the first internet protocol suite 31. The first computing device 100 acquires, e.g. receives, the first source code 100, which is then compiled and/or assembled to generate the first set of computer executable instructions (step 406).

At step 409, the first set of computer executable instructions is executed by the first computing device 100 by using the third memory portion 123, thereby generating the first data item. The first data item encodes the first information which specifies that the first text box 272 in the first Visual Basic form 278 should be replaced by a second text box 277' with a dotted border and comprising characters in bold font that form the sentence "Hello World!".

The first set of computer executable instructions comprises instructions which, when the first set of computer executable instructions is executed by the first computing device 100, cause said device 100 to execute the third set of computer executable instructions. Thus, the first computing device 100 executes the third set of computer executable instructions according to the instructions comprised in the first set of computer executable instructions. In this case, the third set of computer executable instruction accepts the first data item as input.

At step 410, the first computing device 100 executes the instructions of the third set of computer executable instructions that cause said computing device 100 to check whether the first data item fulfils the set of verification conditions. In this embodiment, the first data item has to fulfill a set of verification conditions that consists of the condition that the first data item shall have a first specific data type, e.g. a value-type data type attribute. This condition is implemented by requiring that the input of the third set of computer executable instructions has the specific data type mentioned above. If the first data item does not have this specific data type, an exception is generated by the first computing device 100 and the first embodiment of the method terminates.

If, instead, the first data item fulfills the verification condition on its data type, the first computing device 100 executes the instructions (hereinafter also referred to as: "storing instructions") of the third set of computer executable instructions that cause said device 100 to manipulate the first data item so as to store the first information in the second memory portion 122 in the form of the third data item (step 413).

In particular, the storing instructions cause the first computing device to generate the third data item, which comprises the first information, and to store the third data item in the second memory portion 122, thereby storing the first information in said memory portion.

The third data item may have a value-type data type attribute, e.g. the third data item may be an integer. For instance, the actual value of the third data item, say the integer "5", may be associated to an entry of an array, said array collecting a plurality of sets of Visual Basic instructions. In particular, the array's entry associated to the actual value of the third data item comprises a first set of Visual basic instructions which, when executed, cause the first computing device to generate a second Visual Basic form 278' that differs from the first Visual Basic form 278 in that the first text box 272 is replaced by the second text box 272'. Thus, in this case, the third information, e.g. the actual value of the third data item, specifies that the second Visual Basic form 278' has to be generated.

At step 414, the first computing device generates the second data item by using the third data item. In particular, the second set of computer executable instructions comprise instructions which, when executed by the first computing device 100, cause said device to generate the second data item which comprises the command data and second video data.

In particular, the second video data are generated by using the actual value of the third data item to access the array's entry comprising the first set of Visual basic instructions. The first computing device 100 generates the second video data by using the first set of Visual basic instructions so that, when said video data are processed by the video streaming software of the second computing device 200, the video display window 271 on the screen 270 displays the second Visual Basic form 278'.

At step 415, the second data item is sent to the second computing device 200 via the second Internet protocol suite 21.

Upon receipt of the second data item, the video streaming software of the second computing device 200 causes the video display window 271 of the second computing device 200 to stream the second video data. As best shown in FIG. 4b, the second video data render the second Visual basic form 278' comprising the second text box 272' with the dotted border 277'. The second text box 270' comprises characters in bold font forming the sentence "Hello world!".

Moreover, the video streaming software causes the second computing device to generate the interactive mask 279 according to the command data. If so wished, the user of the second computing device 200 may modify the second Visual Basic form 278 rendered in the video display window 271 by acting on the oval buttons 273-275 comprised in the interactive mask 279 overlain over the video display window 271.

The invention claimed is:

1. A computer implemented method for executing a first set of computer executable instructions by using at least a third memory portion (123) of a memory (120) of a first computing device (100), the third memory portion (123) being allocated to the first set of computer executable instructions and the first set of computer executable instructions comprising instructions which, when the first set of computer executable instructions is executed by the first computing device (100), cause the first computing device to generate at least a first data item comprising first information and to store the first data item in the third memory portion (123),
wherein the first computing device (100) also executes a second set of computer executable instructions by using at least a first memory portion (121) of the memory (120) of the first computing device (100), the first memory portion (121) being allocated to the second set of computer executable instructions and consisting of a second memory portion (122), the third memory portion (123) and a fourth memory portion (124),
wherein a third set of computer executable instructions is stored in the fourth memory portion (124) and comprises instructions which, when the third set of computer executable instructions is executed by the first computing device (100), cause the first computing device (100) to store the first information in the second memory portion (122),
wherein the first set of computer executable instructions has no permission to read from the second memory portion (122) and has no permission to write to the second memory portion (122),
and wherein the method comprises at least the steps of:
checking whether the first set of computer executable instructions is stored in the first memory portion (121), wherein, if the first set of computer executable instructions is not stored in the first memory portion (121):
checking whether the first source code is stored in the memory (120), wherein, if the first set of computer executable instructions is not stored in the first memory portion (121) and the first source code is not stored in the memory (120):
acquiring at least a first portion of the first source code from a secondary memory; and/or
acquiring at least the first portion of the first source code from a database system;
compiling and/or assembling a first source code thereby obtaining the first set of computer executable instructions;
executing the first set of computer executable instructions by using at least the third memory portion (123) thereby generating the first data item and storing the first data item in the third memory portion (123); and
executing the third set of computer executable instructions thereby storing the first information in the second memory portion (122).

2. Method according to claim 1, further comprising the step of:
receiving initiating data from a second computing device (200) for initiating the step of executing the first set of computer executable instructions.

3. Method according to claim 2, further comprising the step of:
providing the second computing device (200) with a set of predetermined commands (279), wherein the set of predetermined commands (279) consists of the commands which the second computing device (200) is allowed to give to the first computing device (100).

4. Method according to claim 1, further comprising the step of:
generating a second data item using at least the first information stored in the second memory portion (122).

5. Method according to claim 4, further comprising the step of:
sending the second data item to a third computing device.

6. Method according to claim 4, wherein the second data item comprises video data and, in particular, consists of video data.

7. Method according to claim 1, further comprising the step of:
checking whether the first data item and/or the first information fulfil a set of verification conditions.

8. Method according to claim 1, wherein the first information stored in the second memory portion is comprised in a third data item, the third data item being stored in the second memory portion (122),
wherein the third data item has a data type attribute, the data type attribute being value-type, or wherein the third data item is a field or a property of an object.

9. Method according to claim 1, further comprising the step of:
receiving the initiating data from the second computing device (200) for initiating the step of executing the first set of computer executable instructions,
wherein the initiating data comprises information about the second computing device (200) and
wherein the step of checking whether the first set of computer executable instructions is stored in the first memory portion (121), the step of checking whether the first source code is stored in the memory (120), and/or the step of acquiring at least the first portion of the first source code depend on the information about the second computing device (200).

10. A data processing system (100, 200) comprising at least a memory (120, 220) and a processor (110, 210) configured to perform the method according to claim 1.

11. A computer program product comprising instructions which, when the program is executed by a computer (100, 200), cause the computer (100, 200) to carry out the method according to claim 1.

12. A computer-readable storage medium comprising instructions which, when executed by a computer (100, 200), cause the computer (100, 200) to carry out the method according to claim 1.

13. Method according to claim 5, wherein the second data item comprises video data and, in particular, consists of video data.

14. Method according to claim 1, further comprising the step of:
- receiving the initiating data from the second computing device (200) for initiating the step of executing the first set of computer executable instructions,
- wherein the initiating data comprises information about the second computing device (200) and
- wherein the step of checking whether the first set of computer executable instructions is stored in the first memory portion (121), the step of checking whether the first source code is stored in the memory (120), and/or the step of acquiring at least the first portion of the first source code depend on the information about the second computing device (200).

* * * * *